Sept. 22, 1964   C. O. BREITSPRECHER   3,149,643
RELIEF VALVE
Filed Aug. 14, 1961

Inventor.
Charles O. Breitsprecher.
By. Hofgren, Brady, Wegner
Allen & Stellman
Attorneys.

United States Patent Office 3,149,643
Patented Sept. 22, 1964

3,149,643
RELIEF VALVE
Charles O. Breitsprecher, Racine, Wis., assignor to Racine Hydraulics & Machinery, Inc., a corporation of Wisconsin
Filed Aug. 14, 1961, Ser. No. 131,391
3 Claims. (Cl. 137—469)

This invention relates to a valve, and more particularly to a relief valve.

A primary object of this invention is to provide a new and improved relief valve.

Another object of this invention is to provide a new and improved high capacity relief valve of small size.

Still another object is to provide a new and improved relief valve which opens rapidly responsive to a predetermined pressure setting and fluid flows straight through the valve.

A more specific object is the provision of a relief valve having a valve body with a passage for fluid and normally closed valving in the passage dividing the passage into first and second sections, the valving including a valve member mounted in the first section and movable toward the second section for closing the valve and away from the second section for opening the valve, the valve member opening responsive to a high fluid pressure in the first section for relieving the pressure.

Figure 1:
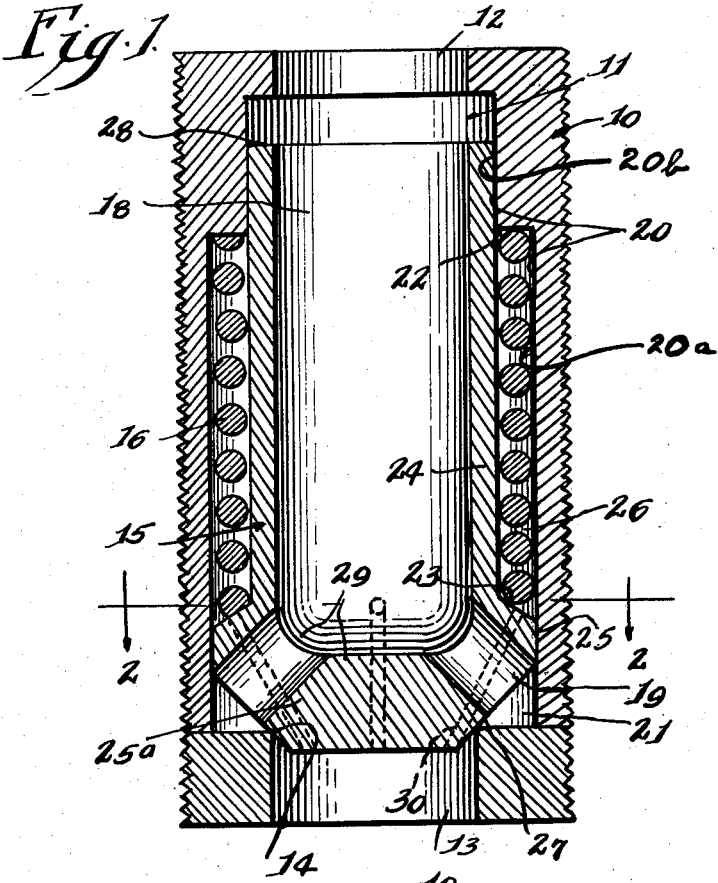
Figure 2:
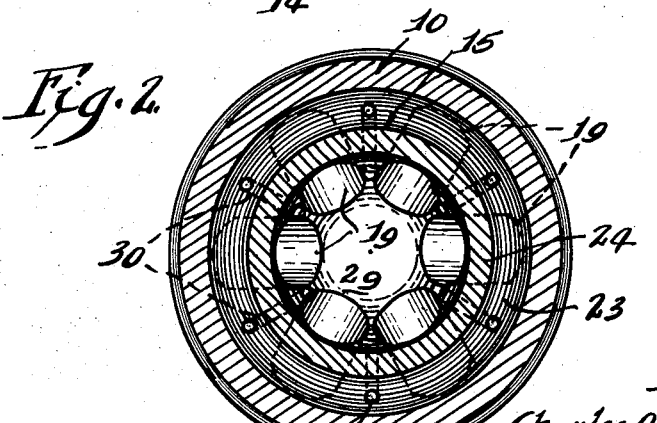

Other objects and advantages will become readily apparent from the following detailed description taken in connection with the accompanying drawings, in which:

FIGURE 1 is a diametric sectional view of a valve embodying the principles of the present invention; and FIGURE 2 is a sectional view taken generally along the line 2—2 of FIGURE 1.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

The invention is, in brief, directed to a heavy duty, high capacity, relief valve for unidirectional flow of fluid, and is particularly applicable to use as a safety valve in high capacity hydraulic shock absorbers. For example, a hydraulic shock absorber for a railroad car coupler absorbs extreme shocks as may occur when a freight car is "humped" and allowed to roll into another car in making up a train, or in the event that the engineer "takes slack" in a string of freight cars to more easily start the train by permitting the locomotive to gain substantial speed and abruptly jerking each car into motion as the slack is progressively removed from each coupling. A shock absorber cylinder having hydraulic fluid on both sides of a reciprocally mounted piston connected to the railroad car coupler provides an environment particularly suited to the relief valve of this invention. Relief of excessive pressures in either direction through the shock absorber piston may be provided by mounting the unidirectional relief valves facing in opposite directions through the piston. Severity of maximum service forces cannot be positively controlled and therefore the relief valve must be extremely rugged and capable of rapidly handling large volumes of fluid. The relief valve opens and closes abruptly, rather than progressively, upon being subjected to an excessive pressure. Such shock absorber pistons are relatively small and therefore a suitable relief valve must have extremely small outside dimensions in proportion to a large volume and high flow rate of hydraulic fluid which must be handled under extreme conditions. Other means are provided for the conventional passage of hydraulic shock absorber fluid from one side of the piston to the other during normal shock absorbing operation.

By the construction and arrangement of the valve of this invention an extremely small and high capacity relief valve of extremely simple construction is provided. When an excessive pressure of the hydraulic shock absorber fluid is encountered on one side of the piston, valve members of the relief valves facing in the direction to relieve excessive pressure on that side open in a direction opposite to the direction of flow of the excessively high pressure hydraulic fluid. Resilient means, such as a spring, maintain the valve member closed until the predetermined excessive opening pressure is encountered and the relief valve is constructed and arranged to thereupon open abruptly for very rapid release of the excessively high fluid pressure on one side of the shock absorber piston.

Referring to the drawings, in the illustrated embodiment of the invention the relief valve has a cylindrical valve body 10 with an external thread for threadedly mounting the relief valve in a suitable threaded bore in the shock absorber piston. The valve body 10 has a passage for fluid including a valve chamber 11 with an inlet 12 and an outlet 13. Valving including a valve seat 14 and a valve member 15, divides the passage into a first section communicating with the inlet 12, and a second section, downstream of the valve seat. Valve member 15 is reciprocally mounted in the first passage section, and is seated on the valve seat 14 in the closed position of the relief valve. Retention of the valve member 15 in a normally closed position is provided by resilient means, here in the form of a spiral compression spring 16.

In the preferred embodiment, when the relief valve is opened by movement of the valve member 15 away from the valve seat, straight-through flow of hydraulic fluid is provided between the inlet 12 and the outlet 13, which are aligned along the longitudinal axis of the cylindrical valve chamber 11. An important feature of the invention is that the flow of fluid through the valve is not obstructed by valve actuating mechanism associated with either the inlet or the outlet.

Unidirectional flow of fluid through the open relief valve is provided in the present embodiment from the inlet 12 into a cup-shaped hollow 18 of the valve member 15 and through a plurality of axial spaced passages 19 in a head 25a of the valve member, and then into the outlet 13.

Valve chamber 11 has a generally cylindrical side surface 20 aligned with the longitudinal axis of the relief valve and the chamber 11. Cylindrical side surface 20 of the chamber 11 has a larger diameter portion 20a connected with the outlet 13 by a first annular shoulder 21 extending inwardly from cylindrical surface 20a. A smaller diameter portion 20b of cylindrical side surface 20 opens into inlet 12. Valve seat 14 is circular and is defined by the edge juncture of the outlet side surface and the shoulder 21.

The relief valve is closed by movement of the valve member 15 toward the second section and into seated engagement with the valve seat 14 in part through the force of spring 16. The smaller and larger diameter portions of the cylinder side surface 20 of the valve chamber 11 are connected adjacent the inlet end of the valve chamber by a step providing an abutment for seating an end of the spring 16, and here in the form of a second annular shoulder 22. An opposite end of the spiral spring 16 is seated on an annular shoulder 23 connecting the outer side surface of a skirt portion 24 of the valve member 15 with an outer side surface 25 of a head 25a of the valve member to locate the spring, in effect, within a spring chamber 26.

In the illustrated embodiment the valve member is in the form of a poppet valve generally resembling a skirted piston wherein the head 25a is provided with a tapered or frusto-conical surface on a valve face 27, which is seated against the valve seat 14 when the valve is closed.

The surface areas of the valve member which are in communication with fluid in the inlet passage 12 are arranged so that a relatively high fluid pressure in the inlet exerts a relatively small effective opening force on the valve member 15. More particularly, a relatively small opening force results from almost balancing the pressure responsive surface areas at both sides of the valve member which are in communication with the inlet 12 and transverse to the path of reciprocal movement of the valve member. This path, in the illustrated embodiment, is the longitudinal axis of the valve chamber 11.

These surfaces of the valve member in communication with fluid in the inlet 12 include, at one side, the portion of the frusto-conical end surface 27 between the valve seat 14 and the cylindrical side surface 20a of the valve chamber 11, and, at the other side, an end surface 28 on the skirt of the valve member 15, and a base surface 29 of the cup-shaped hollow 18 in the valve member 15. The net effective area of these surfaces responsive to fluid pressure which are all within the valve chamber 11 is greater in the direction tending to open the valve rather than close it, thereby urging the relief valve open responsive to fluid pressure in the inlet 12. More particularly, the effective area of the portion of frusto-conical end surface 27 between the valve seat 14 and the cylindrical side surface 20a of the valve chamber 11 is just slightly greater, when the valve is closed, than the combined effective areas of the skirt end surface 28 and the base surface 29 of cup-shaped hollow 18. It should be noted that the peripheral portion of valve face 27 is in communication with inlet 12 through the six passages 19 in valve head 25a which open into the space between the valve face 27 and the valve chamber first annular shoulder 21.

As soon as the valve member 15 cracks open, the effective area of the frusto-conical valve face 27 increases, and the inlet pressure acting on this increased area insures rapid opening of the relief valve. When the valve face 27 is unseated the effective area thereof is the area normal to the longitudinal axis between the chamber side 20 and an imaginary circle on the valve face from which perpendiculars to the valve face 27 pass through the edge of the valve seat 14. Thus the greater the space between the valve seat 14 and the valve face 27 the greater is the effective area of the valve face 27, and upon initial opening of the valve the greater the resultant open force. Therefore, although a relatively small force responsive to a relatively high inlet pressure tends to move the valve member 15 off the valve seat 14, when the valve member is unseated the increasing effective area of the valve face 27 acted upon by the high inlet pressure produces a relatively high opening force for rapidly opening the valve.

Similarly, the valve member 15 has surfaces in communication with the outlet 13. These surfaces have effective areas normal to a path of reciprocal movement, or longitudinal axis, of the valve member 15. One of these effective areas is responsive to fluid pressure in the outlet 13 to urge the valve member 15 against valve seat 14 to maintain the relief valve closed. One effective area is the end of the valve member 15 extending slightly into the outlet 13 when the relief valve is closed and the other is the valve member annular shoulder 23 on which the lower end of the spring 16 is seated. The effective area of the valve member annular shoulder 23 is greater than the effective area of the end of the valve member 15 in the outlet passage 13 to maintain the valve closed. Shoulder 23 communicates with the outlet 13 through a plurality of axially spaced passages 30 which provide communication between the spring chamber 26 and the outlet 13. In the present embodiment six passages 30 open through the valve member annular shoulder 23. The passages 30 also provide a leakage path from the spring chamber 26 to prevent leakage at the skirt from adding to the reaction of the spring 16. The passages 30 have an orifice area exceeding the orifice area possible at the skirt of the valve.

Any suitable oil may be used in the relief valve, but an aircraft hydraulic oil, or 10W–30 detergent type motor oil is preferred. The effective areas in communication with the inlet 12 and the outlet 13, along with the force of the spring 16 are so balanced as to provide an almost instantaneous full opening of the relief valve, and more particularly in about a hundredth of a second.

To summarize the operation of the preferred embodiment of the relief valve as illustrated in the drawings, assume an initial state of equilibrium wherein the fluid pressure in the inlet 12 is substantially the same as the fluid pressure in the outlet 13. Under these conditions the relief valve will be closed with the valve face 27 seated on the valve seat 14 by the force of the spiral compression spring 16 in the second or spring chamber 26. When fluid pressure in the inlet 12 rises above a predetermined amount, the inlet fluid pressure acting on end surface 28 and base surface 29 continues to urge the valve member closed, but the relief valve opens responsive to inlet fluid pressure applied through passages 19 to the larger effective area of the portion of the valve face 27 between the valve seat 14 and the valve chamber cylindrical side surface 20 which overcomes the force of the spiral compression spring 16. Because the effective area normal to the longitudinal axis of the valve chamber 11 is slightly greater in a direction facing generally toward the valve seat 14 than facing generally away from the valve seat 14, a small opening force results which is effective to open the valve responsive to a high inlet pressure and after the valve is cracked open it rapidly opens fully because of the increasing effective area of the valve face 27. A weaker, and therefore a smaller spring 16 may be provided and the over-all dimensions of the relief valve kept relatively small.

In the event that a high fluid pressure is exerted in the outlet 13, this pressure acts on valve member shoulder 23 through the passages 30 in the valve member head 25a to urge the valve member 15 against the valve seat 14 and in cooperation with the spring 16 to more tightly close the relief valve. The area of shoulder 23 exceeds the area of valve face 27 exposed to the outlet to provide this result.

I claim:

1. A relief valve comprising: a valve body having a valve chamber with opposite ends defining an inlet and an outlet, a valve seat; a valve member mounted in said valve chamber, said valve member having a valve face and being movable in a path between a valve closed position with said valve face seated on said valve seat and a valve open position with said valve face spaced from said valve seat in a direction toward said inlet, surface means on said valve member in fluid communication with said inlet by passage means in the valve member for providing an opening force responsive to an increase in inlet fluid pressure, and surface means on said valve member in fluid communication with said outlet by other passage means in the valve member for maintaining said valve member closed responsive to fluid pressure in said outlet.

2. A relief valve comprising: a valve body having a valve chamber; an inlet and an outlet substantially axially aligned and opening into opposed portions of said valve chamber; an annular valve seat around the valve chamber end of said outlet; a valve member mounted in said valve chamber, said valve member having a frusto-conical valve face and being movable in a path between a valve closed position with said valve face seated on said valve seat and a valve open position with said valve face moved inwardly of said valve chamber and away from said valve seat in a direction toward said inlet, said frusto-conical valve face diverging outwardly from said valve seat in a direction toward said inlet; resilient means urging said valve member to said valve closed position; and surface means on said valve member in fluid communication with said inlet, said surface means including said valve face and in closed position being disposed to urge said valve member open with a relatively small opening force responsive to a high inlet fluid pressure, whereby said valve member is cracked open when the inlet pressure is sufficiently high that said opening force exceeds the closing force of said resilient means and the inlet pressure acting against the resultant increased effective area of said frusto-conical valve face provides a relatively high opening force to rapidly fully open said relief valve; and surface means on said valve member in fluid communication with said outlet for maintaining said valve member closed responsive to fluid pressure in said outlet.

3. A relief valve comprising: a valve body having a valve chamber with a longitudinal axis and a side; an inlet and outlet opening into spaced apart portions of said valve chamber and aligned with said axis; an annular valve seat around the chamber end of said outlet and spaced inwardly from said side; a first shoulder extending inwardly from said side to said valve seat; a second shoulder facing said first shoulder and on said side; a valve member within said valve chamber and having a generally frusto-conical valve face transverse to said axis and converging toward said valve seat, said valve member being movable along said axis between a valve closed position with said valve face seated on said valve seat and a valve open position with said valve face spaced from said valve seat in a direction toward said inlet; a shoulder on said valve member facing said second shoulder and spaced therefrom in a direction toward said outlet; a first chamber between said valve face and said first shoulder; a second chamber between said second shoulder and said valve member shoulder; a substantially fluid tight sliding fit between said valve member and said side between said second shoulder and said inlet, and between said valve member shoulder and said valve face; a compression spring in said second chamber; said spring having opposite ends seated, respectively, on said second shoulder and said valve member shoulder for urging said valve member against said valve seat; passage means opening into said first chamber and communicating with said inlet; and second passage means opening into said second chamber and communicating with said outlet.

References Cited in the file of this patent

UNITED STATES PATENTS

| | | |
|---|---|---|
| 2,251,664 | Davis | Aug. 5, 1941 |
| 2,596,368 | Brunton | May 13, 1952 |
| 2,647,015 | Berlyn | July 28, 1953 |
| 2,766,593 | Mitchell et al. | Oct. 16, 1956 |